United States Patent
Nakagawa (10) Patent No.: US 10,162,497 B2
(45) Date of Patent: Dec. 25, 2018

(54) DISPLAY OPERATING DEVICE AND IMAGE FORMING APPARATUS

(71) Applicant: KYOCERA Document Solutions Inc., Osaka (JP)

(72) Inventor: Hiroshi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 163 days.

(21) Appl. No.: 15/258,773

(22) Filed: Sep. 7, 2016

(65) Prior Publication Data

US 2017/0090726 A1    Mar. 30, 2017

(30) Foreign Application Priority Data

Sep. 25, 2015   (JP) ................. 2015-187856

(51) Int. Cl.
*G06F 3/0484*    (2013.01)
*G06K 9/00*    (2006.01)
(Continued)

(52) U.S. Cl.
CPC ..... *G06F 3/04842* (2013.01); *G06K 9/00469* (2013.01); *H04N 1/00411* (2013.01);
(Continued)

(58) Field of Classification Search
CPC .............. G06F 3/04842; G06F 3/0488; G06K 9/00469; H04N 1/00411; H04N 2201/0094; H04N 2201/0089
See application file for complete search history.

(56) References Cited

U.S. PATENT DOCUMENTS

| | | | |
|---|---|---|---|
| 2009/0058861 A1 | 3/2009 | Ihara et al. | |
| 2011/0035664 A1* | 2/2011 | Cho | G06F 3/04886 715/702 |

(Continued)

FOREIGN PATENT DOCUMENTS

JP    2009-059281 A    3/2009

OTHER PUBLICATIONS

Hooper, "i Pad Keyboard Prototype", (May 2, 2012), <URL https://www.youtube.com/watch?v=RGQTaHGQ04Q/>, p. 1-4 (Year: 2012).*

*Primary Examiner* — Ajay M Bhatia
*Assistant Examiner* — Mong-Shune Chung
(74) *Attorney, Agent, or Firm* — Studebaker & Brackett PC (57) ABSTRACT

A display operating device includes a storage section storing therein a plurality of character strings, a receiving section receiving a first character, a display section, a touch panel detecting a touch to the display surface of the display section, and an extraction section extracting first character strings each including the first character from among the character strings. Upon receipt of the first character, the first character is displayed within the input frame and the extracted first character strings are displayed outside the input frame. Upon detection of a touch to the input frame displaying the first character strings, the receiving section receives a second character. Second character strings each including the second character are extracted from among the first character strings. Upon receipt of the second character, the second character is displayed within the input frame and the extracted second character strings are displayed outside the input frame.

9 Claims, 5 Drawing Sheets

(51) Int. Cl.
*H04N 1/00* (2006.01)
*G06F 3/0488* (2013.01)
(52) U.S. Cl.
CPC ........ *G06F 3/0488* (2013.01); *G06K 2209/01* (2013.01); *H04N 2201/0089* (2013.01); *H04N 2201/0094* (2013.01)

(56) References Cited

U.S. PATENT DOCUMENTS

2011/0317194 A1* 12/2011 Nakanishi ............. G06F 3/0237
358/1.13
2012/0311478 A1* 12/2012 van Os ................. G06F 3/0488
715/780
2015/0370477 A1* 12/2015 Kim ..................... G06F 3/0486
715/769

* cited by examiner

DISPLAY OPERATING DEVICE AND IMAGE FORMING APPARATUS

INCORPORATION BY REFERENCE

The present application claims priority under 35 U.S.C. § 119 to Japanese Patent Application No. 2015-187856, filed on Sep. 25, 2015. The contents of this application are incorporated herein by reference in their entirety.

BACKGROUND

The present disclosure relates to display operating devices and image forming apparatuses.

A device has been proposed that extracts a character string including a character appearing first and identical with an input character from among a plurality of character strings and that displays the extracted character string. In a situation in which a plurality of extracted character strings are present, a user switches a displayed screen for searching for a desired character string among the extracted character strings. In a situation in which a huge number of extracted character strings are present, screen switching is burdensome for the user.

In view of the foregoing, a device is now being studied that improves convenience in screen switching for a user who searches for a desired character string. For example, some word input support device causes a screen to display character strings each including a character specified by a user among registered words in the form of a list. The word input support device then specifies a character next to the user specified character among the registered words. When the number of the character strings displayed on the screen among character strings including the specified next character is less than a predetermined reference number, the word input support device switches the screen displaying the character strings with a screen displaying character strings that are different from the character strings displayed on the screen and that each include the determined next character.

SUMMARY

A display operating device according to a first aspect of the present disclosure includes a storage section, a receiving section, a display section, a detection section, and an extraction section. The storage section stores therein a plurality of character strings, The receiving section receives input of a first character. The display section has a. display surface and displays an input frame for display. The detection section detects a touch by a detection target to the display surface of the display section. The extraction section extracts one or more first character strings that each are a character string including the first character from among the plurality of character strings. Upon the receiving section receiving input of the first character, the display section displays the first character within the input frame and the one or more first character strings extracted by the extraction section outside the input frame. Upon the detection section detecting a touch by the detection target to the input frame displaying the first character, the receiving section receives input of a second character. The extraction section extracts one or more second character strings that each are a first character string including the second character from among the one or more first character strings. Upon the receiving section receiving input of the second character, the display section displays the second. character within the input frame and the one or more second character strings extracted by the extraction section outside the input frame.

An image forming apparatus according to a second aspect of the present disclosure includes the display operating device according to the first aspect of the present disclosure and an image forming section. The image forming section forms an image on a sheet.

DETAILED DESCRIPTION

The following describes embodiments of the present disclosure with reference to the drawings. Elements in the drawings that are the same or equivalent are marked by the same reference signs, and explanation of such elements is not repeated.

(First Embodiment)

Figure 1:
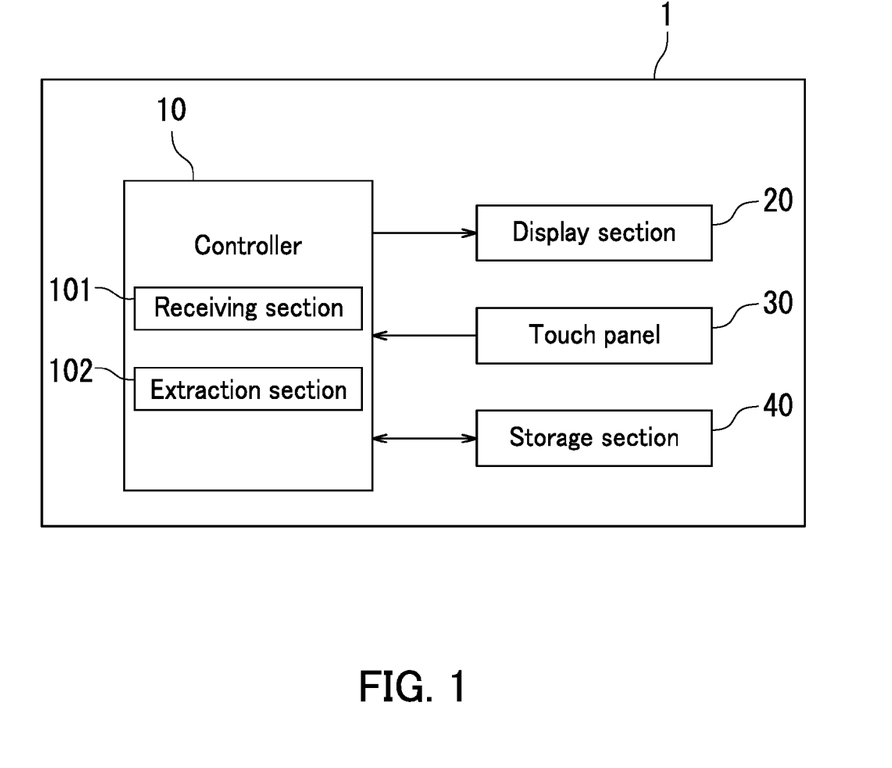
FIG. 1 illustrates a display operating device according to a first embodiment of the present disclosure.
Figure 2A:
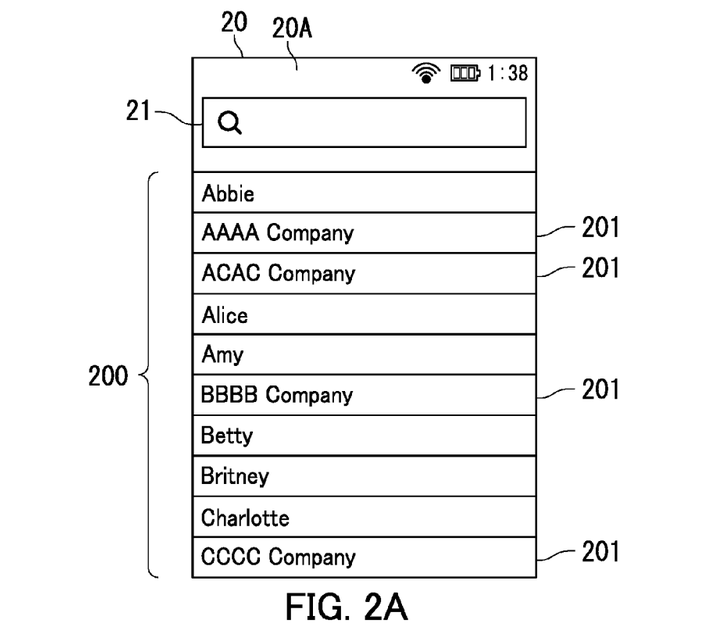
FIG. 2A illustrates a display section included in the display operating device according to the first embodiment of the present disclosure.

With reference to 1-3, description will be made below about a display operating device 1 according to a first embodiment of the present embodiment. FIG. 1 illustrates the display operating device 1. FIG. 2A illustrates a display section 20 that the display operating device 1 includes. The display operating device 1 incudes a controller 10, the display section 20, a touch panel 30 that is a detection section, and a storage section 40.

The storage section 40 includes a main storage device (for example, a semiconductor memory) and an auxiliary storage device (for example, a hard disk drive). The storage section 40 stores therein a plurality of character strings 200. The character strings 200 each include one or more characters. Examples of the one of more characters include a hiragana character, a katakana character, an alphabet, a numeral, and a sign. The character strings 200 each represent a personal name, a company name, or a facility name, for example.

The display section 20 is for example a liquid-crystal display. The display section 20 displays an input frame 21 and a plurality of character strings stored in the storage section 40. The display section 20 further displays a keyboard (not illustrated) that is software, for example. A user inputs a character using the keyboard. The display section 20 displays a character that the user inputs within the input frame 21. Note that the user may input a character using a keyboard (not illustrated) physically provided on the display operating device 1. In the present embodiment, the display section 20 displays a part of the character strings 200 stored in the storage section 40. An upper limit may be set to the number of character strings 200 displayed on the display section 20.

Figure 2B:
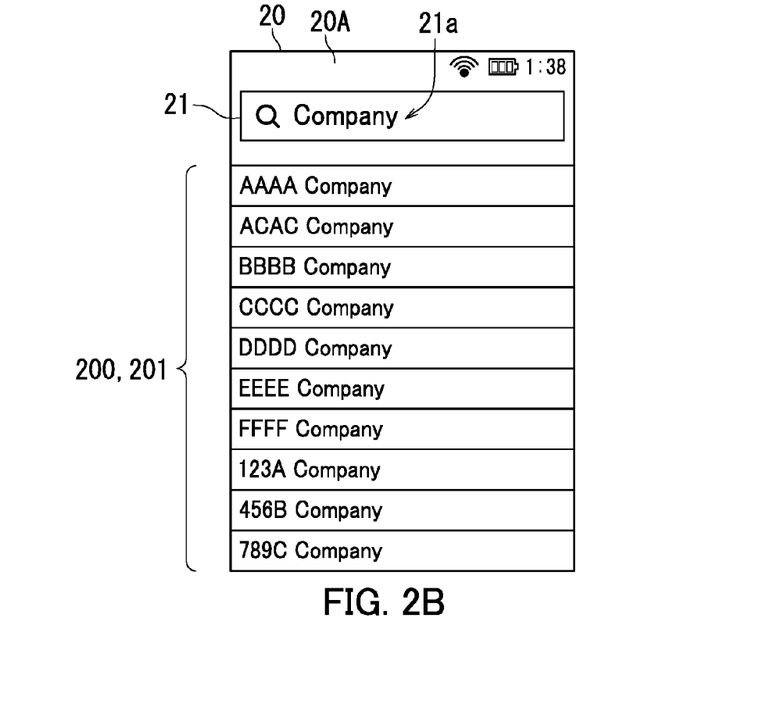
FIG. 2B illustrates the display section in a situation in which a receiving section of the display operating device according to the first embodiment of the present disclosure receives input of first characters.

FIG. 2B illustrates the display section 20 in a situation in which a receiving section 101 receives first characters 21a. The controller 10 incudes the receiving section 101 and an extraction section 102. The receiving section 101 receives input of one or more first character 21a. The display section 20 displays within the input frame 21 the one or more first character 21a of which input the receiving section 101 receives. In the present embodiment, the receiving section 101 receives input of "Company" as a plurality of the first characters 21a. The display section 20 displays, within the input frame 21, "Company" as the plurality of the first characters 21a of which input the receiving section 101 receives.

The extraction section 102 extracts one or more first character strings 201 that each are a character string 200 including the one or more first characters 21a from among the plurality of character strings 200 stored in the storage section 40. In response to the receiving section 101 receiving input of the first characters 21a, the display section 20 displays the one or more first character strings 201 extracted by the extraction section 102 in place of the plurality of displayed character strings 200. That is, upon the receiving section 101 receiving input of the first characters 21a, the display section 20 displays the first characters 21a within the input frame 21 and the one or more first character strings 201 that the extraction section 102 extracts from among the plurality of character strings 200 outside the input frame 21. In the present embodiment, the extraction section 102 extracts a plurality of first character strings 201 that each are a character string including "Company" that is the first characters 21a from among the character strings 200. The display section 20 displays a plurality of first character strings 201. In the present embodiment, the display section 20 displays a part of the first character strings 201 among the extracted first character strings 201. An upper limit may be set to the number of first character strings 201 displayed on the display section 20.

Figure 3A:
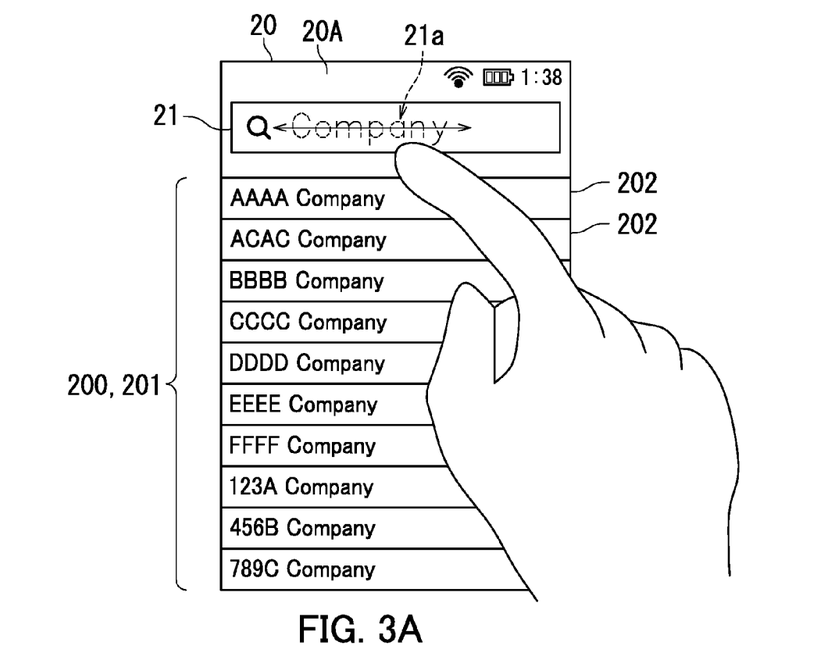
FIG. 3A illustrates a touch operation to a display surface of the display section in the display operating device according to the first embodiment of the present disclosure.

FIG. 3A illustrates a touch operation to a display surface 20A of the display section 20. A touch panel 30 detects a touch by a finger F (detection target) to the display surface 20A of the display section 20. In response to detection of a touch operation by the finger F in a region of the display surface 20A that corresponds to the first characters 21a displayed within the input frame 21, the display section 20 changes a display format of the first characters 21a displayed within the input frame 21. In the present embodiment, the tem touch operation is defined as a movement of the finger F in contact with the display surface 20A that moves while changing a movement direction. Specifically, the touch operation is an operation of the finger F sliding on the display surface 20A, for example. The term change of the display format of one or more first characters 21a is defined as change in shape, color, or size of the first characters 21a displayed on the display section 20. Specific examples of change of the display format of the first characters 21a include changing the first characters 21a so as to be faintly displayed and changing the first characters 21a so as to be displayed in broken lines. In FIG. 3A, the first characters 21a after detection of a touch operation by the finger F are indicated in broken lines for the sake of convenience.

Figure 3B:
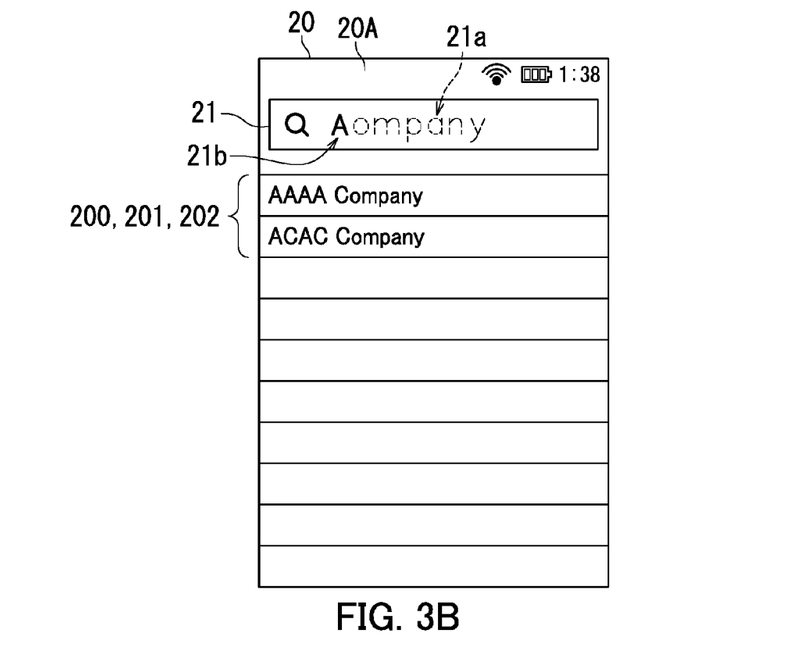
FIG. 3B illustrates the display section in a situation in which the receiving section of the display operating device according to the first embodiment of the present disclosure receives input of a second character

FIG. 3B illustrates the display section 20 in a situation in which the receiving section 101 receives input of a second character 21b. Upon a touch of the finger F to the input frame 21 that displays the first characters 21a, the receiving section 101 is ready to receive input of the second character 21b. The receiving section 101 receives input of the second character 21b through the keyboard that is for example software displayed on the display section 20.

When the receiving section 101 receives the second character 21b, the display section 20 displays the second character 21b in a manner of superposing the second character 21b on the first characters 21a of which display format has been changed. In the present embodiment, the display section 20 displays the second character 21b so as to be superposed on the first characters 21a displayed in broken lines. The extraction section 102 extracts one or more second character strings 202 that each are a first character string 201 including the second character 21b from among the one or more first character strings 201. The extraction section 102 herein extracts one or more second character strings 202 including the second character 21b located at the first or last place thereof among the one or more first character strings 201. In response to the receiving section 101 receiving input of the second character 21b, the display section 20 displays the one or more second character strings 202 extracted by the extraction section 102 in place of the one or more first character strings 201. Specifically, when the receiving section 101 receives input of the second character 21b, the display section 20 displays the second character 21b within the input frame 21 and the one or more second character strings 202 that the extraction section 102 extracts from among the first character strings 201 outside the input frame 21.

In the present embodiment, the receiving section 101 receives input of "A" as the second character 21b. The display section 20 displaying "Company", which is the first characters 21a, in broken lines displays "A" that is the second character 21b so as to superpose the second character 21b on the first characters 21a. The extraction section 102 extracts a plurality of second character strings 202 including "a" that is the second character 21b and that is located at the first or last place thereof from among the one or more first character strings 201. The display section 20 displays "AAAA Company" and "ACAC Company" that are the plurality of second character strings 202. In the present embodiment, the display section 20 displays all extracted second character strings 202. Note that an upper limit may be set to the number of second character strings 202 displayed on the display section 20.

When the receiving section 101 receives deletion of the second character 21b after receiving input of the second character 21b, the display section 20 in response displays a screen that has been displayed before input of the second character 21b. In the present embodiment, in response to the receiving section 101 receiving deletion of "A" that is the second character 21b, the display section 20 displays the screen illustrated in FIG. 3A that has been displayed before the receiving section 101 receives input of the second character 21b.

As has been described so far with reference to FIGS. 1-3B, in the present embodiment, the first character strings 201 each including the first characters 21a are extracted from among the character strings 200 and the second character strings 202 each including the second character 21b are then extracted after detection of a touch of the finger F to the region of the display surface 20A that corresponds to the first characters 21a. In the above configuration, the user can extract the second character strings 202 in a sense of writing and erasing a character on paper present in real space through a touch operation of the finger F sliding the region of the display surface 20A that corresponds to the first characters 21a. As such, the user can extract a desired character string through an intuitive operation.

Furthermore, in the present embodiment, the display section 20 changes the display format of the first characters 21a in response to detection of a touch operation sliding on the region of the display surface 20A that corresponds to the first characters 21a. Specifically, the display section 20 displays the first character 21a faintly. In the above configuration, the user can extract a desired character string through an intuitive operation like rubbing to erase a character written on paper present in real space.

Moreover, in the present embodiment, the second character 21b is displayed so as to be superposed on the first characters 21a displayed faintly. In the above configuration, a desired character string can be extracted through an intuitive operation like writing again a character on the character that has been written and erased on paper present in real space.

Yet, in the present embodiment, the second character 21b is displayed so as to be superposed on the first characters 21a displayed faintly. In the above configuration, the user can input the second character 21b while checking the input first characters 21a.

In the present embodiment, when the first character strings 201 each including the first characters 21a are extracted and the second character 21b is input after a finger touch is input in the region of the display surface 20A that corresponds to the first characters 21a, the second character strings 202 each including the second character 21b located at the first or last place thereof are extracted. In the above configuration, the user can exchange a method of character extraction only by touching the region of the display surface 20A that corresponds to the first characters 21a. As such, the user can change the method of extracting a desired character string through an intuitive operation.

Figure 4:
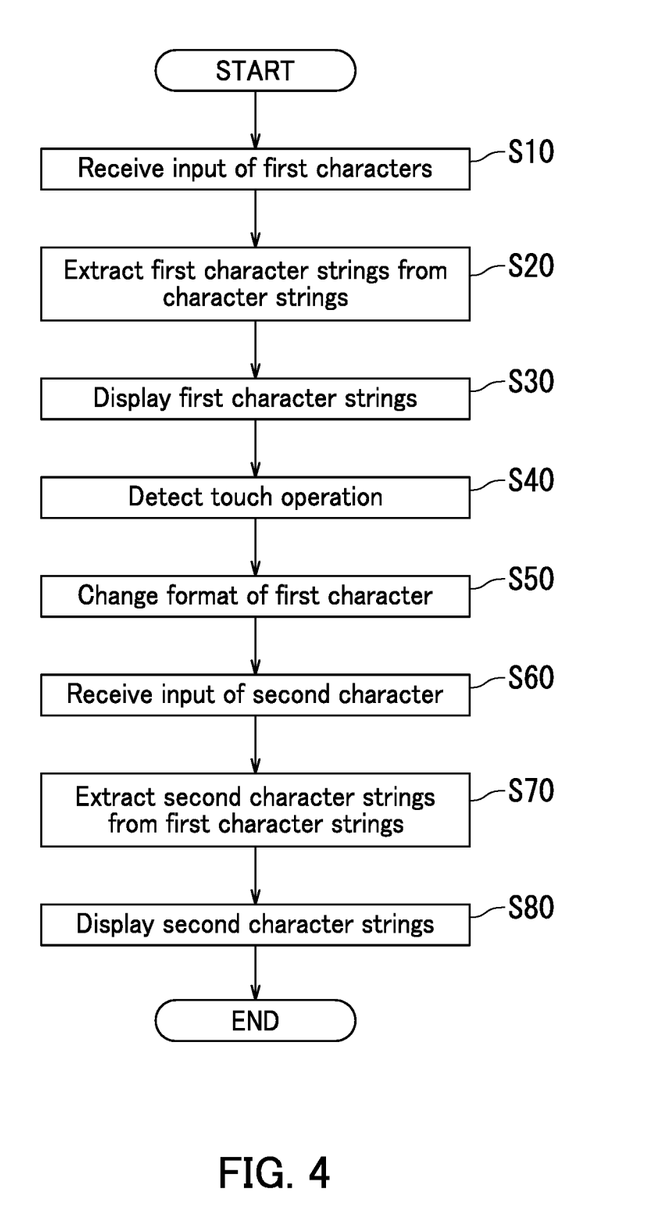
FIG. 4 is a flowchart depicting search control executed by the display operating device according to the first embodiment of the present disclosure.

FIG. 4 is a flowchart depicting search control that the display operating device 1 executes. At Step S10, the receiving section 101 receives input of one or more first characters 21a. At step S20, the extraction section 102 extracts one or more first character strings 201 that each are a character string 200 including the first characters 21a from among the character strings 200.

At step S30, the display section 20 displays the extracted one or more first character strings 201 in place of the character strings 200. At step S40, the touch panel 30 detects a touch operation by the finger F to the input frame 21 within which the first characters 21a are displayed.

At Step S50, the display section 20 changes the display format of the first characters 21a. For example, the display section 20 displays the first characters 21a faintly. At Step S60, the receiving section 101 receives input of a second character 21b. At step S70, the extraction section 102 extracts one or more second character strings 202 that each are a first character string 201 including the second character 21b from among the one or more first character strings 201. At step S80, the display section 20 displays the extracted one or more second character strings 202 in place of the one or more first character strings 201.

As has been described so far with reference to FIGS. 1-4, in the present embodiment, the first character strings 201 each including the first characters 21a are extracted from among the character strings 200 and the second character strings 202 each including the second character 21b are then extracted from among the first character strings 201 after detection of a touch of the finger F to the region of the display surface 20A that corresponds to the first characters 21a. In the above configuration, the user can further extract the second character strings 202 each including the second character 21b from the first character strings 201 only by touching the display surface 20A. As such, the user can extract a desired character string through an easy operation.

(Second Embodiment)

Figure 5:
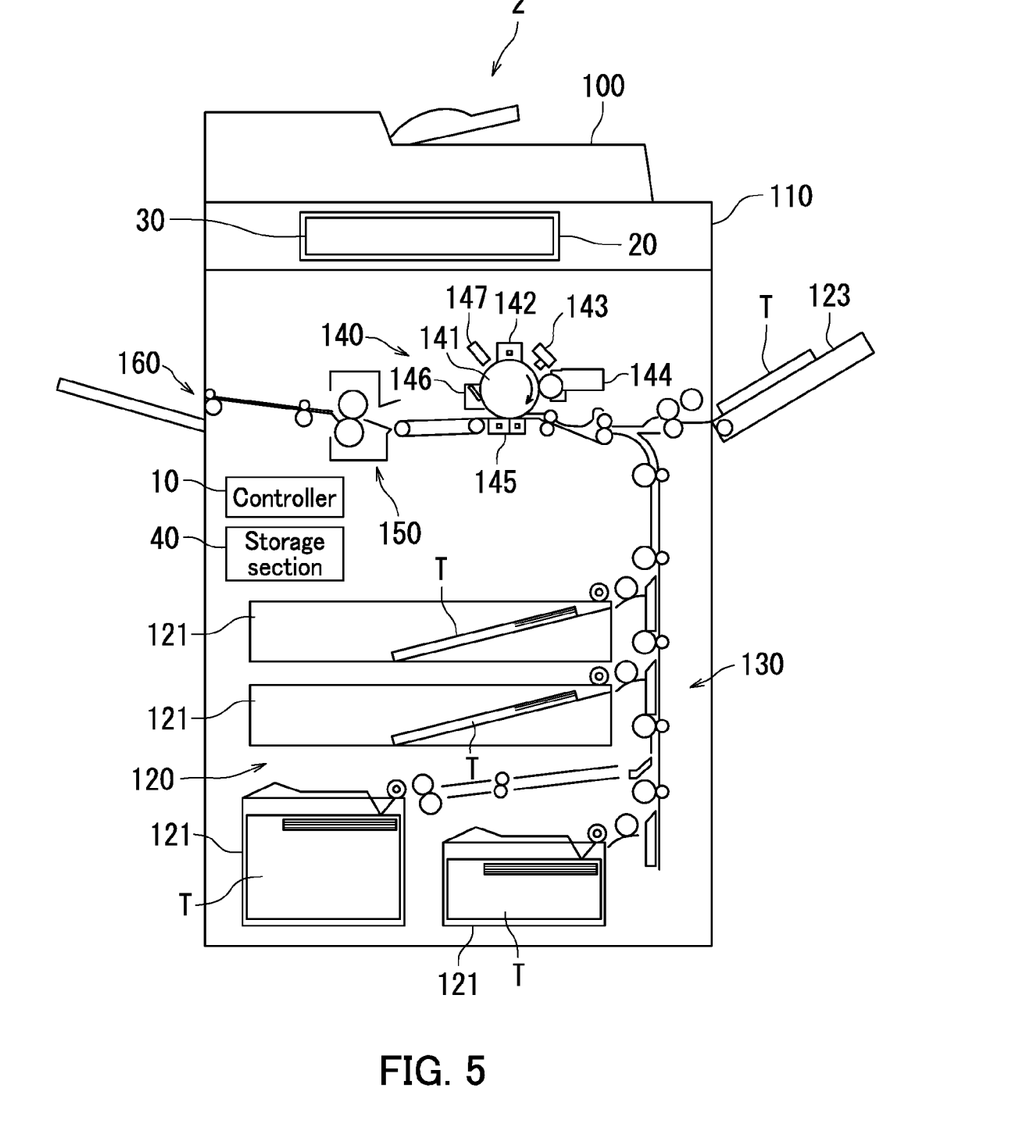
FIG. 5 is a schematic cross sectional view explaining an image forming apparatus according to a second embodiment of the present disclosure.

The following describes an image forming apparatus 2 according to a second embodiment of the present disclosure with reference to FIG. 5. FIG. 5 illustrates the image forming apparatus 2. The image forming apparatus 2 for example is a copier, a printer, a facsimile machine, or a multifunction peripheral. The multifunction peripheral has for example at least two functions of a copier, a printer, and a facsimile machine.

The image forming apparatus 2 incudes a controller 10, a display section 20, a touch panel 30, a storage section 40, a document conveyance section 100, an image reading section 110, an accommodation section 120, a conveyance section 130, an image forming section 140, a fixing section 150, and an ejection section 160. A sheet T is conveyed inside the image forming apparatus 2 in a sheet conveyance direction.

The controller 10 in the present embodiment functions as the controller 10 according to the first embodiment. The display section 20 in the present embodiment functions as the display section 20 according to the first embodiment. The touch panel 30 in the present embodiment functions as the touch panel 30 according to the first embodiment. The storage section 40 in the present embodiment functions as the storage section 40 according to the first embodiment. In the above configuration, the controller 10, the display section 20, the touch panel 30, and the storage section 40 included in the image forming apparatus 2 constitute in combination the display operating device 1 in the first embodiment.

The document conveyance section 100 conveys an original document toward the image reading section 110. The image reading section 110 generates image data by reading an image of the original document. The accommodation section 120 accommodates sheets T. The accommodation section 120 incudes a cassette 121 and a manual feed tray 123. The sheets T are stacked in the cassette 121. The sheets T are fed one at a time from the cassette 121 or the manual feed tray 123 to the conveyance section 130. The sheets T are for example plain paper, copy paper, recycled paper, thin paper, cardboard, glossy paper, or overhead projector (OHP) films.

The conveyance section 130 conveys the sheet T toward the image forming section 140. The image forming section 140 includes a photosensitive drum 141, a charger 142, an exposure section 143, a development section 144, a transfer section 145, a cleaning section 146, and a static eliminating section 147 and forms (prints) an image on the sheet T.

The sheet T to which the image has been transferred is conveyed toward the fixing section 150. The fixing section 150 applies heat and pressure to the sheet T to fix the image to the sheet T. The sheet S is conveyed to the ejection section 165 once the image has been fixed thereto. The ejection section 165 ejects the sheet S.

The storage section 40 includes a main storage device (for example, a semiconductor memory) and an auxiliary storage device (for example, a hard disk drive).

The controller 10 controls respective elements of the image forming apparatus 2. Specifically, the controller 10 controls the display section 20, the touch panel 30, the document conveyance section 100, the image reading section 110, the accommodation section 120, the conveyance section 130, the image forming section 140, the fixing section 150, and the ejection section 160 through execution of computer programs stored in the storage section 40. The controller 10 is for example a central processing unit (CPU).

As has been described so far with reference to FIG. 5, the image forming apparatus 2 according to the second embodiment has a function of the display operating device 1 in the first embodiment. Therefore, a desired character string can be extracted through an easy operation in a manner similar to that in the first embodiment. In addition, advantages similar to those in the first embodiment can be obtained.

The embodiments of the present disclosure have been described so far with reference to the drawings (FIGS. 1-5). However, the present disclosure is of course not limited to the above embodiment and can be implemented in various different forms without deviating from the general theme of the present disclosure (for example, as explained below in sections (1) to (5)). In order to facilitate understanding, the drawings illustrate elements of configuration schematically and properties of the elements of configuration in the drawings, such as thickness, length, and quantity, may differ from reality in order to aid preparation of the drawings. Material properties of elements of configuration in the above embodiments are merely examples that do not impose any particular limitations and can be altered in various ways to the extent that there is not substantial deviation from the effects of the present disclosure.

(1) As described with reference to FIG. 3A, the user touches the display surface 20A of the display section 20 using the finger B that is a detection target. Alternatively, however, a stylus (not illustrated) may be used as the detection target to touch the display surface 20A.

(2) As described with reference to FIG. 3A, the touch operation is defined as a movement of the finger F in contact with the display surface 20A that moves while changing the movement direction. Alternatively, however, the touch operation may be an operation of the finger F in contact with the display surface 20A that keeps stopping for a predetermined time period or an operation of the finger F in contact with display surface 20A that moves in one direction.

(3) As described with reference to FIGS. 3A and 3B, the display section 20 displays, in response to the receiving section 101 receiving deletion of the second character 21*b*, the screen that has been displayed before input of the second character 21*b*. Alternatively, however, the display section 20 may display, in response to the receiving section 101 receiving deletion of the second character 21*b*, the screen displaying the plurality of character strings 200 illustrated in FIG. 2A.

(4) As described with reference to FIG. 3B, the receiving section 101 receives input of a single second character 21*b*. Alternatively, two or more second characters 21*b* may be received.

(5) As described with reference to FIG. 3B, the extraction section 102 extracts one or more second character strings 202 each including the second character 21*b* located at the first or last place thereof from among the one or more first character strings 201. Alternatively, however, the extraction section 102 may extract one or more second character strings 202 each including the second character 21*b* located at a location other than the first and last places thereof from among the one or more first character strings 201.

What is claimed is:

1. A display operating device comprising:
a software keyboard or a physical keyboard to which a character is to be input by a user;
a storage that stores therein a plurality of character strings;
a receiving section configured to receive input of a first character through the software keyboard or the physical keyboard, the receiving section being implemented by a processor that executes a computer program;
a display that has a display surface and that is configured to display an input frame for display;
a touch panel configured to detect a touch by a detection target to the display surface of the display, the detection target being a finger or a stylus; and
an extraction section configured to extract one or more first character strings that each are a character string including the first character from among the plurality of character strings, the extraction section being implemented by the processor, wherein
upon the receiving section receiving input of the first character, the display displays the first character within the input frame and the one or more first character strings extracted by the extraction section outside the input frame,
in response to detection of a touch operation by the detection target to the first character, the display changes shape, color, or size of the displayed first character,
the touch operation is sliding of the detection target on the display surface of the display, and is a movement of the detection target in contact with the display surface that moves while changing a movement direction,
upon the detection section detecting a touch by the detection target to the input frame displaying the first character, the receiving section receives input of a second character through the software keyboard or the physical keyboard,
the extraction section extracts one or more second character strings that each are a first character string including the second character from among the one or more first character strings, and
upon the receiving section receiving input of the second character, the display displays the second character within the input frame so that the second character is superposed on the first character having been changed in shape, color, or size, and displays the one or more second character strings extracted by the extraction section outside the input frame.

2. The display operating device according to claim 1, wherein
the first character of which input the receiving section receives includes a plurality of first characters,
the display displays the plurality of first characters within the input frame, and
the extraction section extracts one or more first character strings that each are a character string including the plurality of first characters from among the plurality of character strings.

3. The display operating device according to claim 1, wherein
the extraction section extracts one or more second character strings each including the second character located at a first or last place thereof from among the one or more first character strings.

4. The display operating device according to claim 1, wherein the display
displays at least a part of the plurality of character strings stored in the storage section,
displays, in response to the receiving section receiving input of the first character, the one or more first character strings each including the first character in place of the plurality of displayed character strings, and
displays, in response to the receiving section receiving input of the second character, the one or more second character strings each including the second character in place of the part of the one or more first character strings.

5. The display operating device according to claim 4, wherein an upper limit is set to any of the numbers of the plurality of character strings, the one or more first character strings, and the one or more second character strings that the display displays.

6. The display operating device according to claim 1, wherein in response to the receiving section receiving deletion of the second character, the display displays a screen that has been displayed before input of the second character.

7. An image forming apparatus comprising:

the display operating device according to claim 1; and
an image forming section configured to form an image on a sheet.

8. The display operating device according to claim 1, wherein in response to detection of the touch operation by the detection target to the first character, the display changes color of the first character so that the first character is displayed faintly or displays the first character in a broken line.

9. The display operating device according to claim 8, wherein the display displays the second character so that the second character is superposed on the faintly displayed first character.

* * * * *